(No Model.)

W. R. DOOLIN.
GREASE BOX FOR VEHICLE WHEELS.

No. 456,024. Patented July 14, 1891.

Witnesses
Inventor
William R. Doolin.
By his Attorneys

UNITED STATES PATENT OFFICE.

WILLIAM RUSSELL DOOLIN, OF KNOX POINT, LOUISIANA.

GREASE-BOX FOR VEHICLE-WHEELS.

SPECIFICATION forming part of Letters Patent No. 456,024, dated July 14, 1891.

Application filed February 26, 1891. Serial No. 382,851. (No model.)

*To all whom it may concern:*

Be it known that I, WILLIAM RUSSELL DOOLIN, a citizen of the United States, residing at Knox Point, in the parish of Bossier and State of Louisiana, have invented certain new and useful Improvements in Grease-Boxes for Vehicle-Wheels; and I do hereby declare the following to be a full, clear, and exact description of the invention, such as will enable others skilled in the art to which it appertains to make and use the same.

This invention relates to a grease-box for the wheels of children's wagons, carriages, &c., to facilitate the lubrication of the same without the necessity of removing the wheels.

The object of the invention is to provide a device that can be attached to any vehicle-wheel and which will perform its work in a satisfactory and efficient manner.

The improvement consists of the novel features, which will be hereinafter more fully described and claimed, and which are shown in the annexed drawings, in which—

Figure 1:
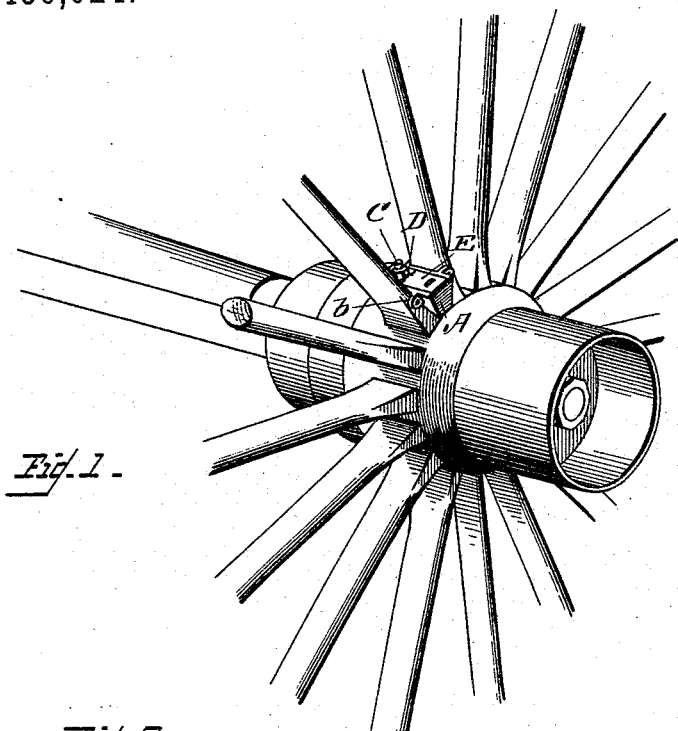
Figures 2, 3:
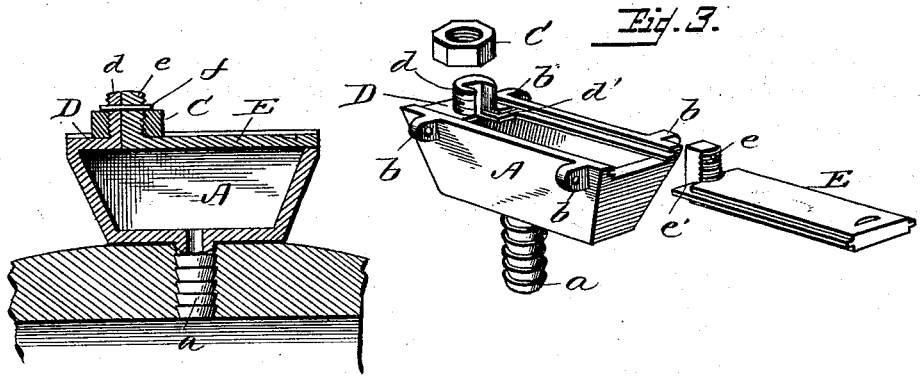
Figure 4:
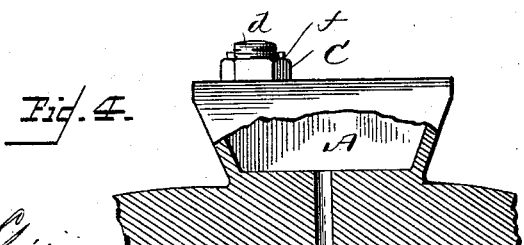

Figure 1 is a perspective view showing the application of the invention. Fig. 2 is a vertical central section of the invention. Fig. 3 is a perspective view of the box, the cover being drawn out, showing the nut detached and arranged in its relative position. Fig. 4 is a detail view of a modification.

The essence of the invention is the cover and the means for securing the parts of the same together. The grease-box A is oblong and its ends diverge to correspond with the angle between two adjacent spokes of the wheel and is provided with the nipple $a$, which enters a bore in the hub. This nipple is roughened on the outside to hold the box in place. Other means may be employed to hold the box in place, such as the ears $b$, which embrace the spokes and have apertures in their outer ends, through which a wire or other means is inserted to hold the box in place. The cover is made in two parts D and E, each having a corresponding projection $d$ and $e$, respectively, on its meeting end. These projections $d$ and $e$ when together are circular in form and are exteriorly threaded, being held together by the nut C, which is screwed on the said projections. The pin $f$ passes transversely through the projections above the nut and serves to prevent the same being jarred off and lost. The projection $d$ is recessed vertically, as shown, to receive the projection $e$. The part D of the cover is fixed, being one with the box, and has a groove $d'$ in its meeting end, which receives a corresponding tongue $e'$ on the part E, which slides in grooves in the sides of the box. For economy of construction the box and the part D of the cover are cast together. In applying the box a hole is bored in the hub between two spokes of the wheel sufficiently large to receive the nipple $a$, which latter is inserted in the said hole and the box pressed home. The bore must extend into the axle-bore of the hub. The grease or lubricant is placed in the box after releasing the part E of the cover and drawing it out, as shown in Fig. 3.

In Fig. 4 the box is shown cast in one piece with the hub, the other features being exactly like those shown in the other figures.

Having thus described my invention, what I claim, and desire to secure by Letters Patent, is—

1. The combination, with the grease-box, of the cover made in two parts, each having a vertical projection, and means for embracing the projections to hold the parts of the cover together, substantially as described.

2. The combination, with the grease-box, of the cover made in two parts, each part having a vertical extension which is exteriorly threaded, and a nut screwed on the said projections, substantially as described, for the purpose specified.

3. A grease-box having a nipple and having its end walls diverging and provided with ears and having the part D of the cover provided with a vertical extension, the part E of the cover adapted to slide in ways in the sides of the box and having a vertical projection, the said vertical projections being exteriorly threaded, and the nut C, screwed on the said projections, the parts being arranged, combined, and operating substantially as set forth.

In testimony whereof I affix my signature in presence of two witnesses.

WM. RUSSELL DOOLIN.

Witnesses:
ENOCH $\times$ SYKES,
   his
   mark
L. H. HOOKER.